US006877730B2

(12) United States Patent
Sawdon et al.

(10) Patent No.: US 6,877,730 B2
(45) Date of Patent: Apr. 12, 2005

(54) POWERED CLAMP

(75) Inventors: Edwin G. Sawdon, S. Clair, MI (US); Andy Sanders, Marysville, MI (US)

(73) Assignee: BTM Corporation, Marysville, MI (US)

( * ) Notice: Subject to any disclaimer, the term of this patent is extended or adjusted under 35 U.S.C. 154(b) by 63 days.

(21) Appl. No.: 10/447,524

(22) Filed: May 29, 2003

(65) Prior Publication Data

US 2004/0239023 A1 Dec. 2, 2004

(51) Int. Cl.[7] .................................................. B23Q 3/08
(52) U.S. Cl. .......................................... 269/32; 269/228
(58) Field of Search ............................ 269/32, 201, 20, 269/228, 24, 27

(56) References Cited

U.S. PATENT DOCUMENTS

| | | | | |
|---|---|---|---|---|
| 4,905,973 A | | 3/1990 | Blatt | |
| 5,171,001 A | * | 12/1992 | Sawdon | 269/32 |
| 5,575,462 A | | 11/1996 | Blatt | |
| 5,853,211 A | | 12/1998 | Sawdon et al. | |
| 5,884,903 A | * | 3/1999 | Sawdon | 269/32 |
| 5,938,259 A | | 8/1999 | Sawdon et al. | |
| 6,059,277 A | | 5/2000 | Sawdon et al. | |
| 6,189,877 B1 | | 2/2001 | Boris et al. | |
| 6,364,301 B1 | | 4/2002 | Takahashi | |
| 6,412,845 B1 | | 7/2002 | Sawdon et al. | |
| 6,557,840 B2 | | 5/2003 | Sawdon | |
| 6,557,841 B2 | * | 5/2003 | Dellach et al. | 269/32 |
| 6,612,557 B2 | | 9/2003 | Sawdon et al. | |
| 6,666,489 B2 | | 12/2003 | Kruger | |
| 2002/0190455 A1 | * | 12/2002 | Sawdon | 269/32 |
| 2004/0084823 A1 | * | 5/2004 | Rentz et al. | 269/32 |

* cited by examiner

*Primary Examiner*—Lee D. Wilson
(74) *Attorney, Agent, or Firm*—Harness, Dickey & Pierce, P.L.C.

(57) ABSTRACT

A powered clamp includes a pair of moveable members which engage one another to maintain, at least temporarily, a locking position of an arm when actuating fluid pressures have been decreased or lost. In another aspect of the present invention, the apparatus is simplified by engaging a slide rod with a rotatable hub. Furthermore, the overall packaging envelope required by the clamp is reduced by aligning the transverse axis of the rotatable hub with a longitudinal axis of an actuator.

32 Claims, 7 Drawing Sheets

POWERED CLAMP

BACKGROUND AND SUMMARY OF THE INVENTION

The invention relates generally to clamping devices and particularly to a powered clamp having a toggle action with a self-locking feature.

Powered clamps are commonly used in industrial applications for holding work pieces of many sizes and shapes during forming, welding and/or machining operations. Such devices typically include a pneumatically, hydraulically or electrically actuated cylinder which causes one or more arms to move through a desired range of rotational motion. Furthermore, the user may wish to actuate the arms in a contaminated environment having weld splatter, saw chips, coolants, dust, dirt and the like. One such conventional powered clamp is disclosed in U.S. Pat. No. 5,171,001 entitled “Sealed Power Clamp” which issued on Dec. 15, 1992 and is hereby incorporated herein by reference.

Other traditional clamps have arms which typically move or release pressure upon the work piece when the actuating force is reduced or lost. Furthermore, the machining tolerances of the majority of the internal clamp components must be accurately controlled in order to achieve desired component part motions and to achieve satisfactory clamping forces.

Another powered clamp disclosed in U.S. Pat. No. 5,884, 903 entitled “Powered Clamp and Engaging Apparatus” issued on Mar. 23, 1999 and is hereby incorporated by reference. This clamp incorporates a variety of components including a slide, a link, a crank and a hub. The components also combine to provide a lost linear motion device to maximize arm unlocking forces. While the above-mentioned clamps have satisfactorily performed a desired function, it is desirable to provide a clamp having a reduced number of components. Also, it is desirable to provide a powered clamp that will not release its grip when actuating pressure is removed.

In accordance with the present invention, an embodiment of the apparatus performs as a clamp with a moveable member or members which perform a clamping function. The clamp includes a pair of moveable members which mechanically butt against each other to maintain, at least temporarily, a locking position of an arm when actuating forces have been decreased or lost.

The powered clamp apparatus of the present invention is highly advantageous over conventional clamps because the present invention includes a tapered self-locking feature for holding a rotated arm in a desired position even after loss of actuating force occurs. Thus, work pieces will not fall from their locked or engaged positions, thereby preventing work piece and equipment damage. Another advantage of the present invention apparatus is that the overall packaging envelope required by the clamp is reduced by aligning the transverse axis of a rotating hub with a longitudinal axis of a piston. The present invention is further advantageous by employing a slide rod including an angled surface which selectively engages a seat on the hub when the actuator is in a fully extended position. The slide rod and hub mating surfaces function to restrict movement of the actuator away from the fully extended position regardless of the presence of actuating fluid pressure. The present invention apparatus includes presence of actuating fluid pressure. The present invention apparatus includes an end cap having a pair of fluid ports. The end cap is rotatable about a longitudinal axis of the clamp to allow the user to easily connect the clamp to a fluid power source. Furthermore, the present invention advantageously includes a position sensor operable to indicate the presence or absence of an actuator at a predetermined location. A position sensor may be configured to accommodate electrical connections at twelve different orientations. The present invention apparatus is fully sealed and permanently lubricated and is therefore suitable for use in even the most contaminated environments. The power clamp apparatus is also very compact and lightweight, and may have its clamping or engaging arm easily preset to any one of a number of positions. The total rotational angle of the arm is also adjustable. Additional advantages and features of the present invention will become apparent from the following description and dependent claims, taking in conjunction with the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
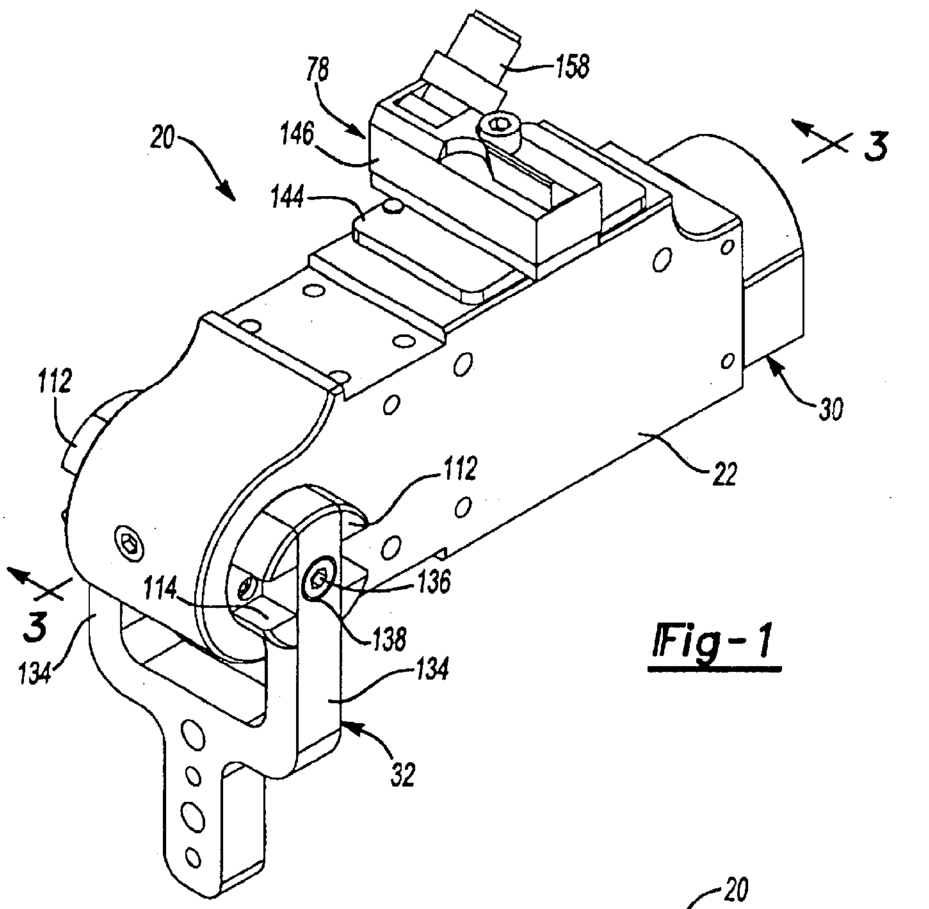
FIG. 1 is a perspective view showing the preferred embodiment of a powered clamp apparatus of the present invention.

The following description of the preferred embodiment is merely exemplary in nature and is in no way intended to limit the invention, its application, or uses.

Referring to FIGS. 1–5, the preferred embodiment of a powered clamp 20 includes a body 22, an actuator 24, a link

26, a hub 28, an end cap 30 and a yoke arm 32. Yoke arm 32 is located externally to body 22 while the other previously referenced components are at least partially internally disposed within body 22.

Body 22 is forged or extruded and then machined from 6061-T651 aluminum as a unitary, substantially hollow, part. End cap 30 is coupled to the proximal end of body 22. End cap 30 includes a substantially cylindrical portion 34 and a flange portion 36. Cylindrical portion 34 includes a pair of annular seal grooves 38. Elastomeric seals 40 are positioned within grooves 38 to sealingly engage a bore 42 extending through body 22. Bore 42 extends along a longitudinal axis 44. End cap 30 includes another annular groove 46 axially spaced apart from seal grooves 38. Roll pins 48 extend through body 22 and are positioned within groove 46 to couple end cap 30 to body 22. It should be appreciated that this method of attachment axially restrains end cap 30 from movement while allowing the end cap to rotate 360 degrees about longitudinal axis 44.

A first fluid port 50 and a second fluid port 52 are positioned on an end face 54 of flange portion 36. First fluid port 50 is in fluid communication with a proximal end of bore 42. Second fluid port 52 exits at an aperture 56 located between elastomeric seals 40. Aperture 56 fluidly communicates with a passageway 58 extending substantially parallel to bore 42 within body 22. Passageway 58 is in fluid communication with a distal end of bore 42. A plug 60 is coupled to end cap 30 to assure that pressurized fluid entering second fluid port 52 exits at aperture 56 and supplies pressure to the distal end of bore 42.

Actuator 24 includes a piston 62 and a slide rod 64. A stroke spacer 66 may be coupled to piston 62 to adjust the total range of rotation of yoke arm 32. A set of stroke spacers is available to the user to vary the arm rotation range in increments of 15 degrees. It will be appreciated that any number of stroke spacers having varying thicknesses can be provided to achieve a desired total stroke range. Piston 62 is linearly moveable within bore 42. Piston 62 is axially moved in response to pneumatic or hydraulic fluid pressures forcing the piston in either longitudinal direction. Slide rod 64 is coupled to piston 62 via a threaded fastener 68. Slide rod 64 is axially translatable within a bore 70. Bore 70 extends substantially parallel to but offset from longitudinal axis 44. An annular piston seal 72 is provided between piston 62 and bore 42. An annular slide rod seal 74 is positioned between slide rod 64 and bore 70.

Piston 62 includes a generally cylindrical body 75 having a flat 76 for use in conjunction with a sensor assembly 78 as will be described in greater detail hereinafter. Piston 62 includes a first end face 82 and a second end face 84. Stroke spacer 66, if necessary, is coupled to first end face 82 via a spacer fastener 86. A shim pack 88 is coupled to second end face 84 of piston 62 by a shim fastener 90. The thickness of shim pack 88 may be varied at final assembly to assure proper operation of clamp 20. Specifically, the thickness of shim pack 88 accounts for variance in machining and assures that yoke arm 32 continues to exert a clamping force on a work piece even if supply pressure is reduced or lost. Shim pack 88 also functions to assure that slide rod 64 is not overly forced into contact with hub 28. It is desirable for actuator 24 to be returned using available pressurized fluid acting on second end face 84 of piston 62 without additional assistance.

Slide rod 64 is a substantially cylindrical member having a first end 92 and a bifurcated second end 94. First end 92 is coupled to piston 62 as previously described. An aperture 96 extends through bifurcated second end 94. Slide rod 64 includes a flat 98 to assure that the slide rod does not trigger sensor assembly 78 during actuation. Slide rod 64 further includes an angled surface 100 (FIGS. 3 and 14–17) extending at a 5 degree angle. Angled surface 100 is positioned near second end 94. Slide rod 64 is preferably constructed from ASTMA311 Class B chrome material. Angled surface 100 includes a Titanium Nitride treatment or is otherwise hardened to improve the longevity of slide rod 64.

Link 26 includes a first aperture 102 aligned with aperture 96 extending through bifurcated second end 94 from slide rod 64. A pin 104 rotatably interconnects link 26 to slide rod 64. Preferably, pin 104 is slip fit within aperture 96 for easy assembly.

Figure 2:
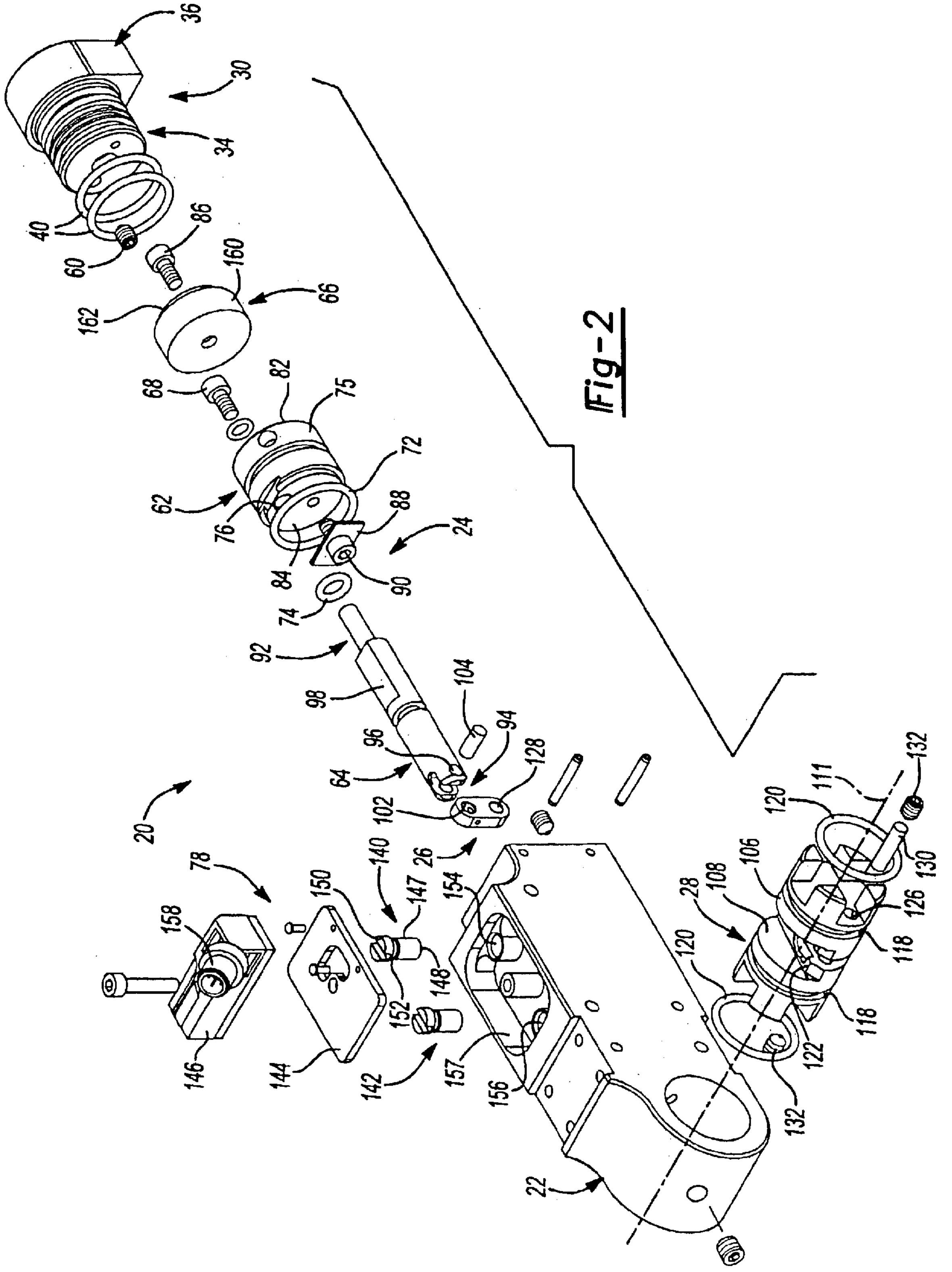
FIG. 2 is an exploded perspective view depicting the present invention.
Figure 4:
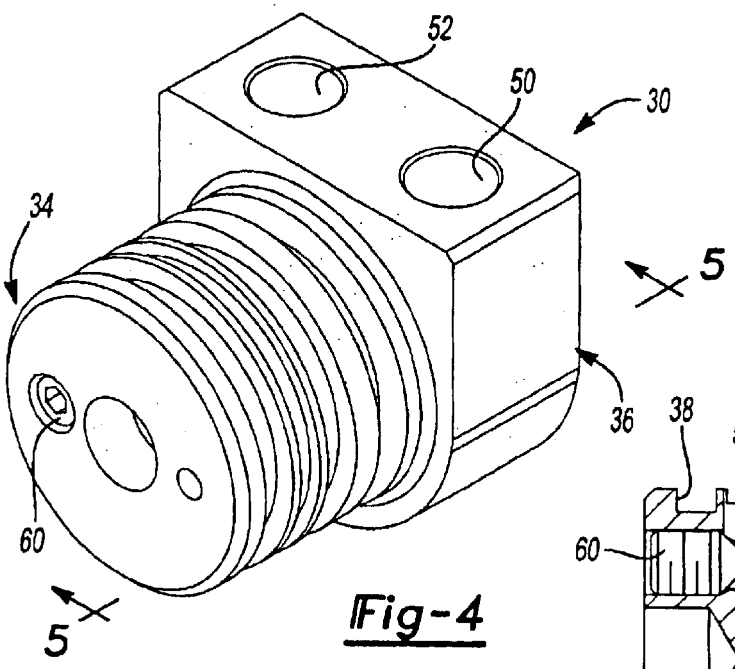
FIG. 4 is a perspective view of an end cap constructed in accordance with the teachings of the present invention.
Figure 5:
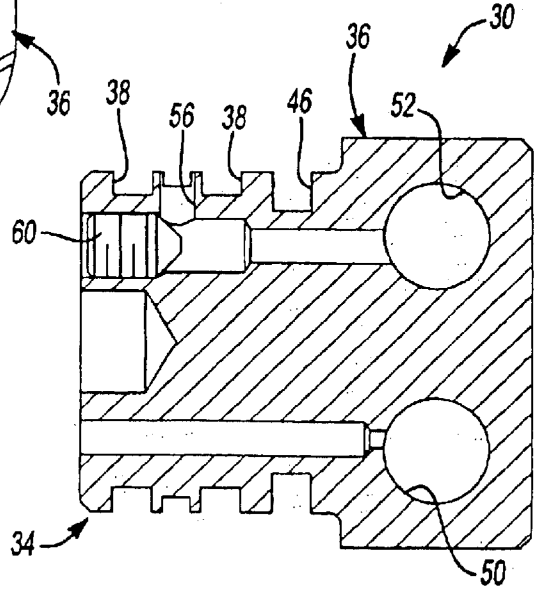
FIG. 5 is a cross-sectional view taken along line 5—5 as shown in FIG. 4.
Figure 6:
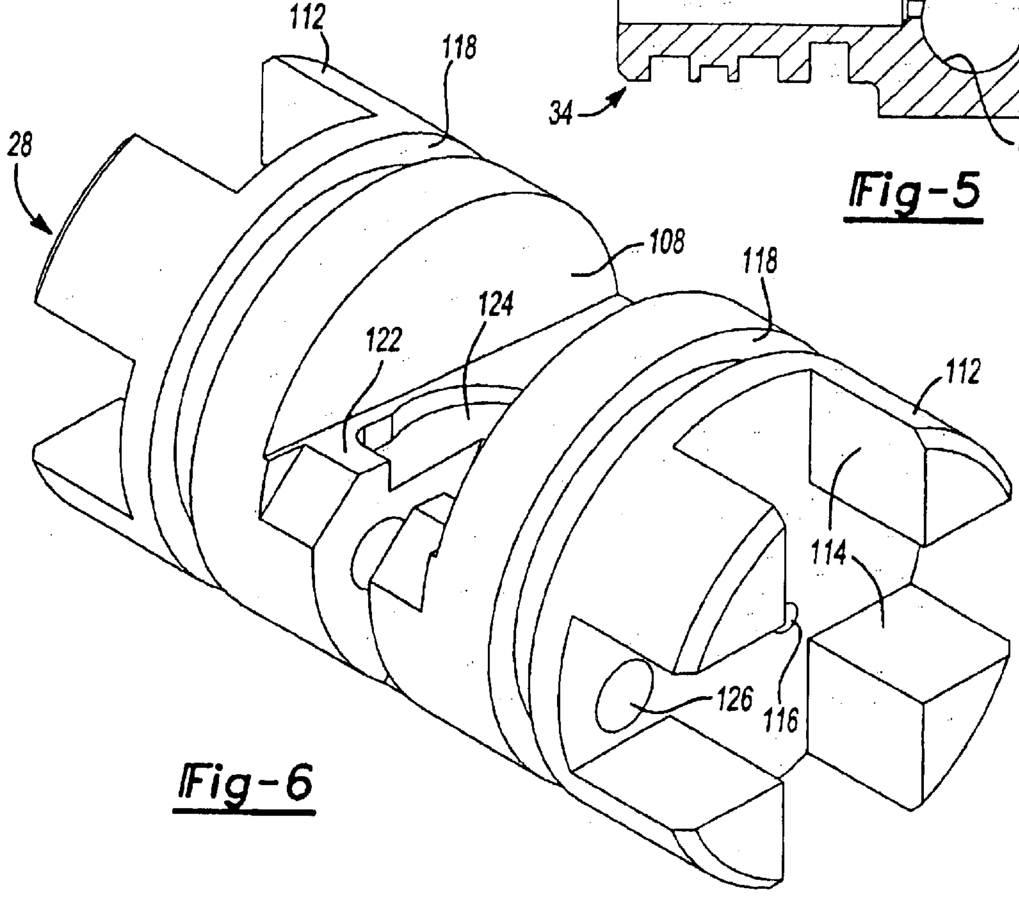
FIG. 6 is a perspective view of a hub constructed in accordance with the teachings of the present invention.

As shown in FIGS. 2 and 6, hub 28 has a cylindrically shaped peripheral surface 106 partially split by a laterally extending channel 108. Peripheral surface 106 of hub 28 is rotatably received within a matching cross-bore 110 extending through the side walls of body 22. Cross-bore 110 defines a transverse axis 111 substantially orthogonally intersecting longitudinal axis 44. End portions 112 of hub 28 extend beyond and project outwardly from the side walls of body 22. Each of end portions 112 include a pair of orthogonally oriented slots 114. A threaded aperture 116 is also positioned in each of end portions 112. Hub 28 also includes a pair of axially spaced apart annular grooves 118. Elastomeric O-rings 120 are positioned within grooves 118 to sealingly engage cross-bore 110. Within channel 108, a seat 122 is formed or machined at a 5 degree self-locking angle. A recess 124 is formed within seat 122 to assure clearance is maintained between second end 94 of slide rod 64 and hub 28. An aperture 126 extends through hub 28. Link 26 includes a second aperture 128 aligned with aperture 126 of hub 28. A pin 130 rotatably interconnects link 26 and hub 28. A pair of set screws 132 capture pin 130 within aperture 126. Hub 28 is formed from 4150HT HRS.

Figure 9:
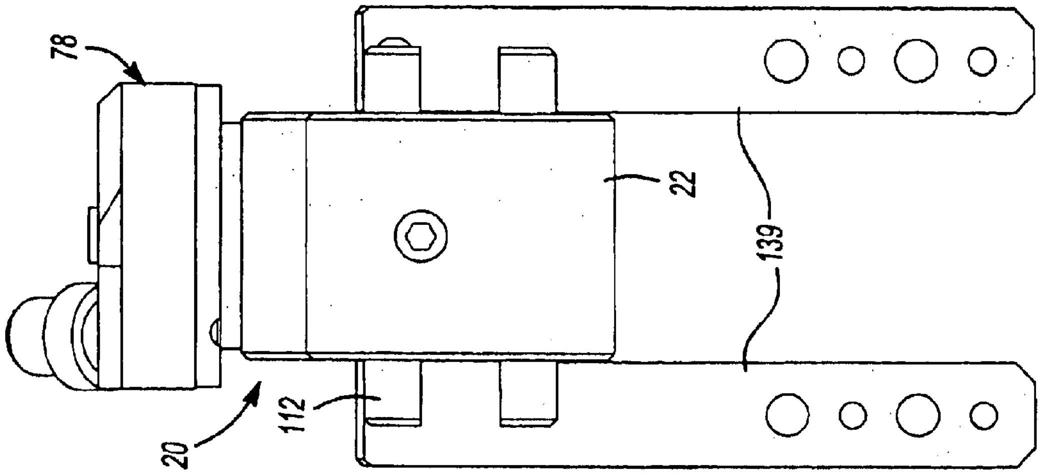
FIG. 9 is a top view of another alternate embodiment clamp having dual straight arms.
Figure 8:
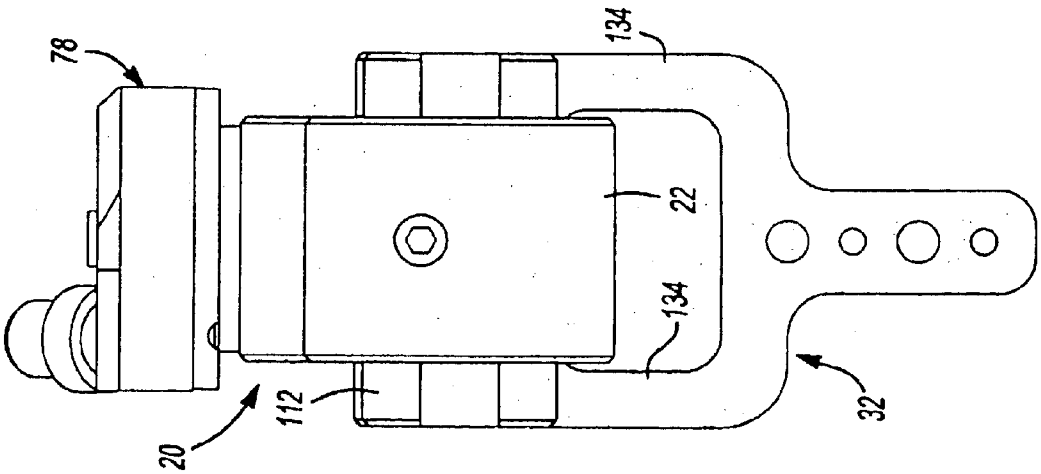
FIG. 8 is a top view of an alternate embodiment clamp having a yoke arm.
Figure 7:
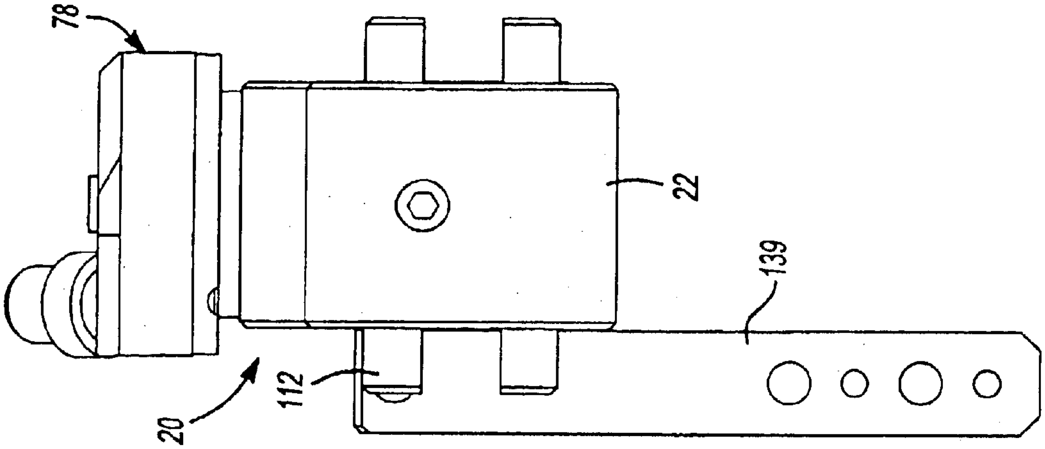
FIG. 7 is a top view depicting an alternate embodiment clamp having a single straight arm.

With reference to FIG. 1, yoke arm 32 includes a pair of bifurcated legs 134 coupled to hub 28. Each bifurcated leg 134 is positioned within one of slots 114 and is coupled to hub 28 with a threaded fastener 136. Threaded fastener 136 extends through a counter bore 138 formed in leg 134 and threadingly engages threaded aperture 116. Alternately, a singular arm 139 or pair of straight arms may be coupled to the faces of hub 28 as shown in FIGS. 7–9.

Figure 10:
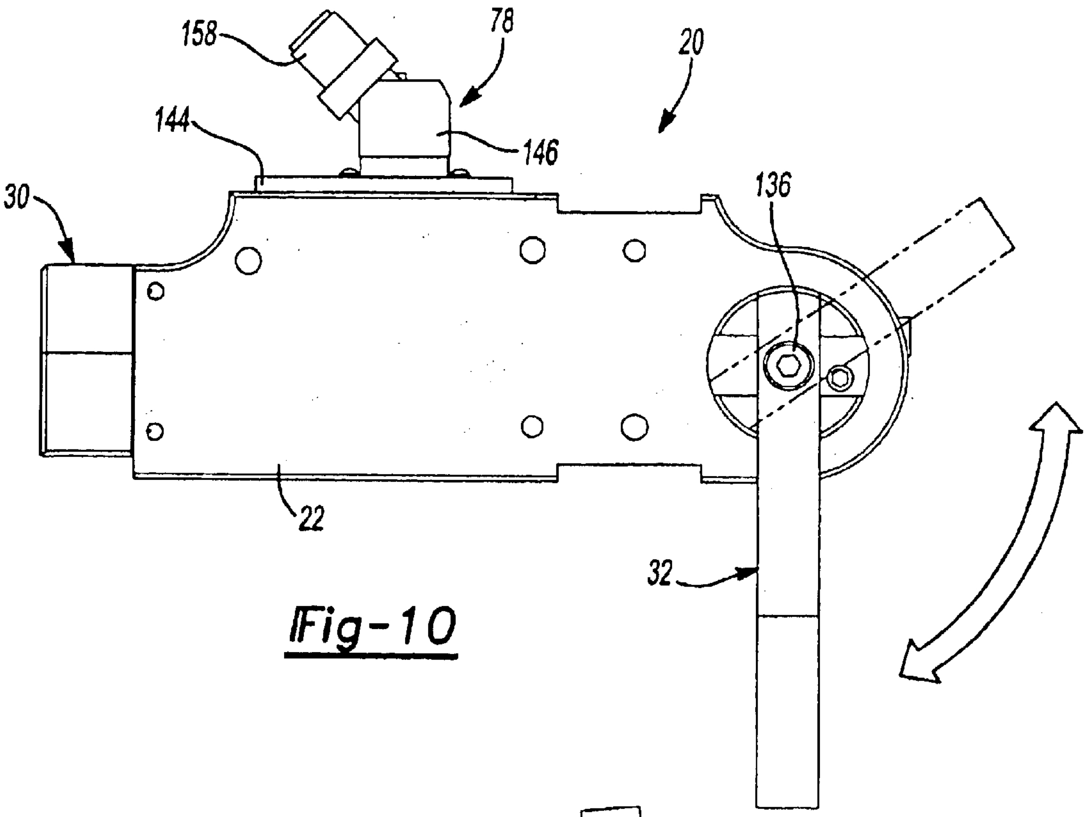
FIG. 10 is a side view of a clamp constructed in accordance with the teachings of the present invention having an arm positioned at 90 degrees to the body when located in its fully rotated position.
Figure 11:
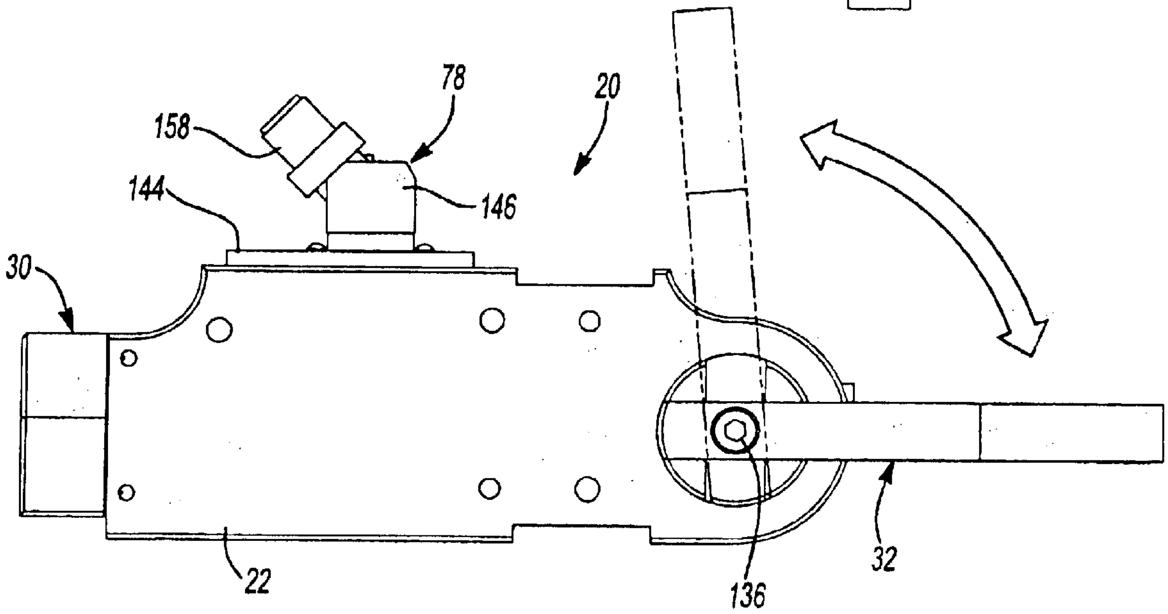
FIG. 11 is a side view of a clamp having an arm positioned substantially in-line with the body when the arm is in a fully rotated position.

As shown in FIGS. 10 and 11, the user may vary the final position of yoke arm 32 by choosing the appropriate slot 114. Yoke arm 32 may be positioned substantially in line with longitudinal axis 44 as shown in FIG. 11. Alternatively, yoke arm 32 may be rotated to a position extending 90 degrees to longitudinal axis 44 when the arm is in the fully rotated or closed position as depicted in FIG. 10.

Figure 12:
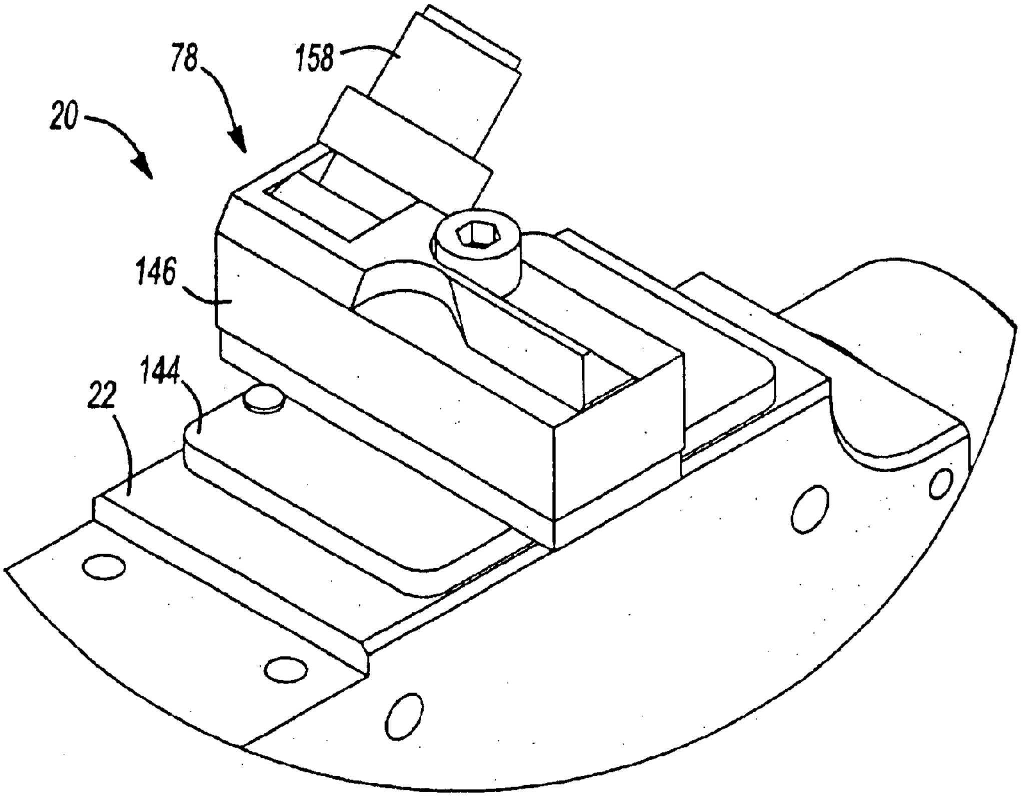
FIG. 12 is a partial perspective view of the clamp of the present invention having a position sensor oriented at an exemplary first position.
Figure 13:
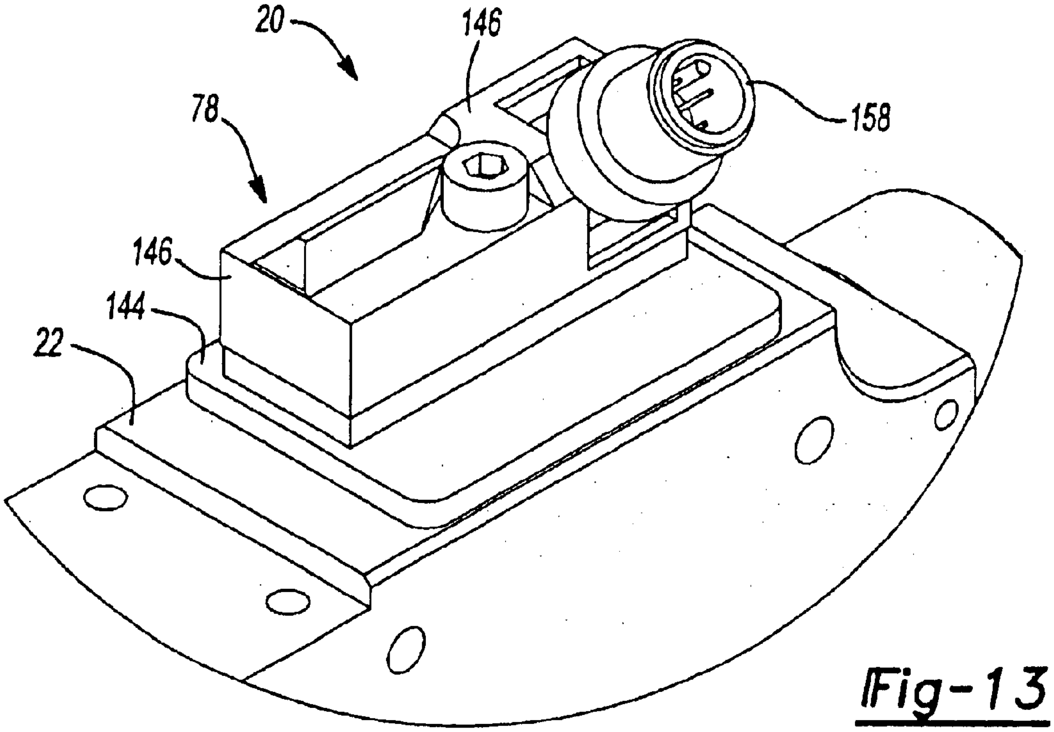
FIG. 13 is a partial perspective view of a clamp of the present invention having the position sensor oriented at an alternate exemplary second position.

As shown in FIGS. 2, 12 and 13, sensor assembly 78 includes a first sensor head 140, a second sensor head 142, a cover 144 and a controller switch 146. First sensor head 140 and second sensor head 142 are proximity sensors which sense the presence or absence of a component within a given distance of the sensor head. First and second sensor heads 140 and 142 are substantially identical to one another. Accordingly, only first sensor head 140 will be described in detail. First sensor head 140 includes a cylindrical body 147 having a first end face 148 and a second end face 150. An annular elastomeric seal 152 is positioned between body 147 and a first sensor bore 154 extending from an outer surface of body 22 to bore 42. Body 22 includes a second sensor bore 156 axially offset from first sensor bore 154.

First sensor head 140 is positioned within first sensor bore 154 such that first end face 148 is adjacent bore 42. Second sensor head 142 is similarly positioned within second sensor bore 156. Cover 144 is coupled to body 22 to restrict the sensor heads from being axially pushed out of their respective bores during pressurization of bore 42. For example, second end face 150 of first sensor head 140 contacts cover 144 when bore 42 is pressurized. Controller switch 146 is mounted to cover 144. Wires (not shown) interconnect first sensor head 140 and controller switch 146 as well as second sensor head 142 and controller switch 146. The wires are at least partially positioned within a cavity 157 and concealed by cover 144. Controller switch 146 includes a pivotable plug 158 selectively positionable in one of three locations. Plug 158 may extend generally parallel to the mounting plane defined by cover 144, at 45 degrees thereto or at 90 degrees thereto. Furthermore, control switch 146 may be mounted to body 22 in one of four orientations relative to the body. Two such orientations are depicted at FIGS. 12 and 13. Accordingly, it should be appreciated that twelve plug position permutations are available to allow a user to easily couple sensor assembly 78 to a data collection device or programmable controller.

Because the linear stroke of actuator 24 is adjusted by coupling spacers 66 of various thickness to piston 62, sensor assembly 78 may be positioned at one designated location on body 22. This is advantageous because it is not necessary to machine a plurality of apertures for receipt of sensor heads 140 and 142 for different strokes. Furthermore, the design of the present invention alleviates the need for sensor repositioning which may lead to inaccuracy possibly causing tool or component damage.

As mentioned earlier, piston 62 includes a generally cylindrical body 75 having a flat 76 positioned thereon. The discontinuity between cylindrical body 75 and flat 76 provides a trigger for second sensor head 142. When actuator 24 is in the fully extended position shown in FIG. 3, body 75 of piston 62 is positioned closely enough to the distal end of second sensor head 142 to emit a signal indicating the presence of the piston. In similar fashion, spacer 66 includes a body portion 160 and a lead portion 162. Lead portion 162 has a smaller diameter than body portion 160. The junction of the different diameters provides a triggering point to signal first sensor head 140. When actuator 24 is in the fully retracted position, spacer 66 contacts end cap 30. At this time, enlarged body portion 160 is positioned proximate to first end face 148 of first sensor head 140.

Figure 14:
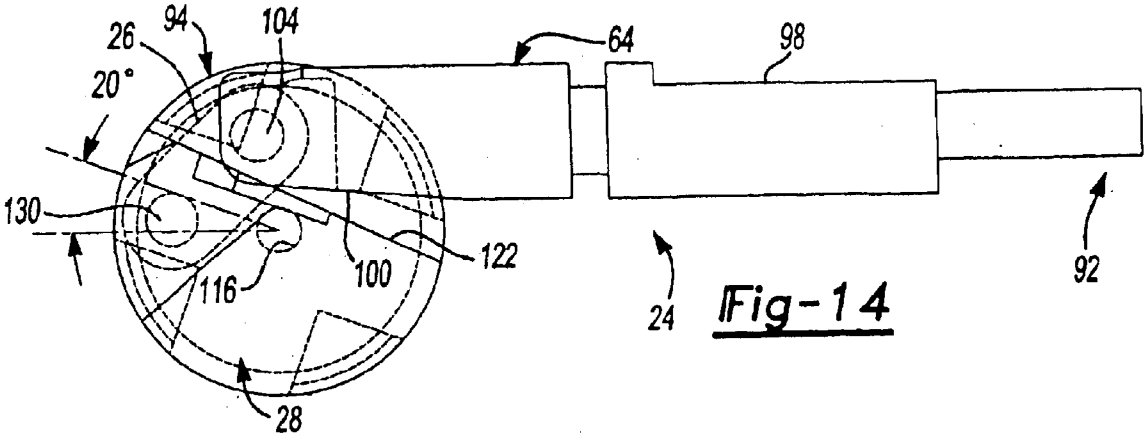
FIGS. 14–17 depict a slide rod, link and hub assembly at various positions during operation.
Figure 15:
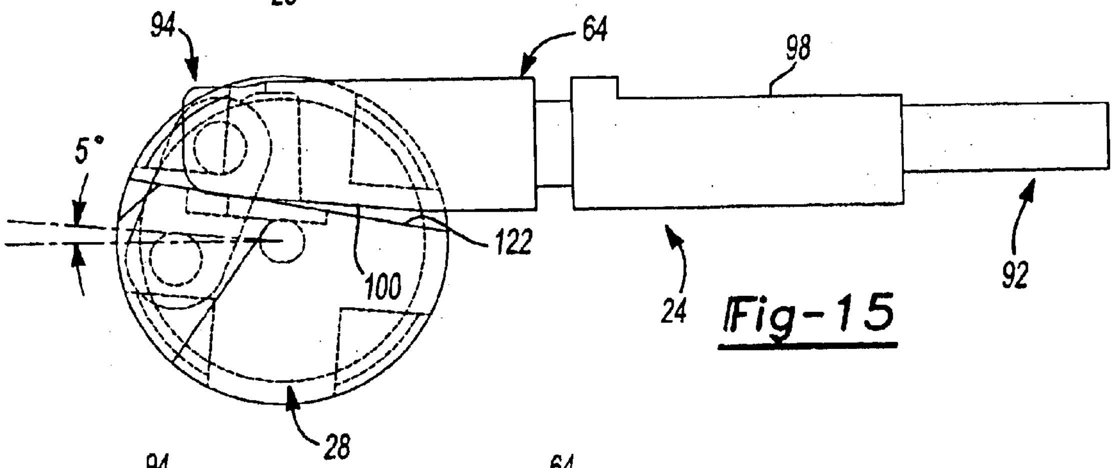
Figure 16:
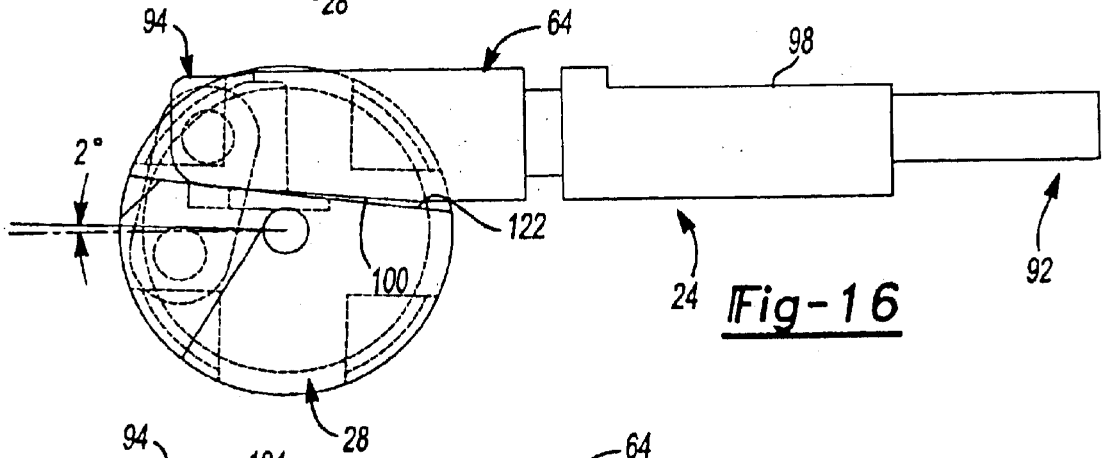
Figure 17:
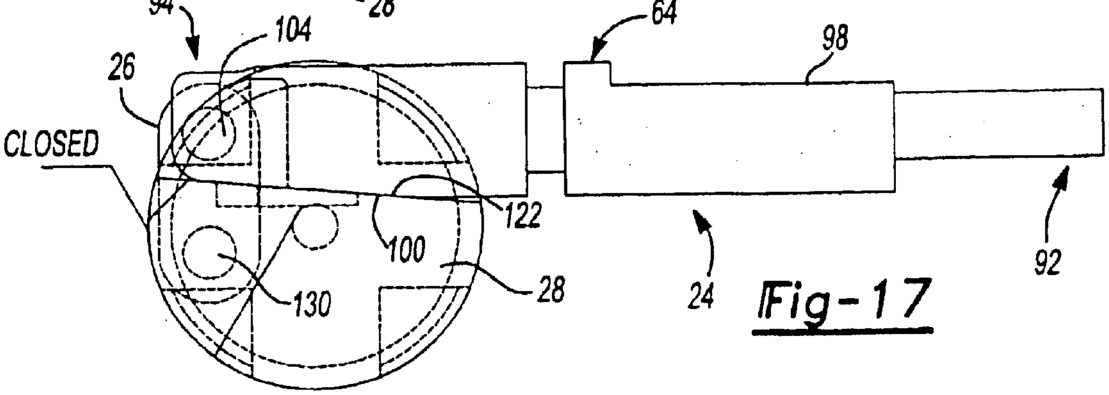

The sequence of operational steps may be observed with reference to FIGS. 14–17. Specifically, FIG. 14 shows hub 28 rotated 20 degrees from a location where actuator 24 is in a fully extended position as shown in FIG. 17. When comparing FIGS. 11–14 to one another in numerically ascending order, actuator 24 is moving toward the fully extended position. Yoke arm 32 simultaneously moves toward a clamped position. Movement in this direction is caused by providing a source of pressurized fluid to first fluid port 50. Pressurized fluid acts on spacer 66 to drive actuator 24 toward the fully extended position. It will be appreciated that each of FIGS. 14–16 show slide rod 64 being spaced apart from hub 28. Angled surface 100 does not cam or slide on seat 122. Contact occurs only when actuator 24 is at the fully extended or closed position as shown in FIG. 17. At this time, angled surface 100 frictionally engages seat 122 to cause a self-locking condition. At the same time, link 26 is rotated to a slightly over-center position. The over-center position of link 26 is defined by the center line of pin 104 being positioned closer to the proximal end of clamp 20 than pin 130. As such, a force applied to yoke arm 32 attempting to rotate hub 28 in a clockwise direction with reference to FIG. 17, would be resisted even if pressure being applied through first port 50 were to be released.

Figure 3:
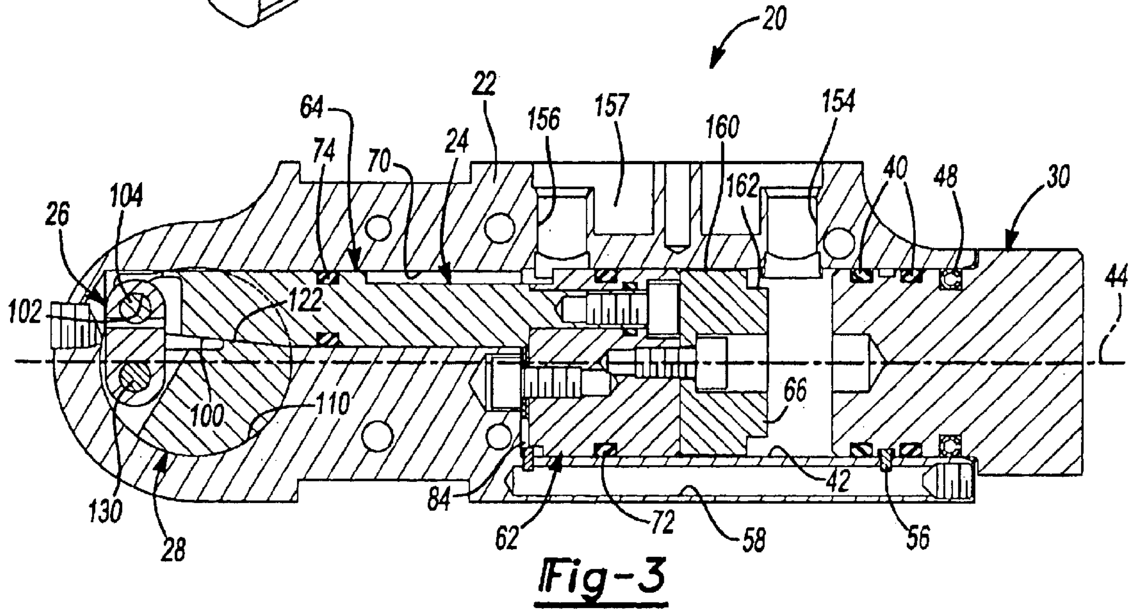
FIG. 3 is a cross-sectional side view of the powered clamp of the present invention.

Actuator 24 may be moved from the fully extended position shown in FIG. 3 into a retracted position by venting pressure from first fluid port 50 and applying pressure through second fluid port 52. Pressure applied from second fluid port 52 acts on second end face 84 of piston 62 to cause angled surface 100 to disengage from contact with seat 122. Actuator 24 may be fully returned when spacer 66 contacts end cap 30. Hub 28 and yoke arm 32 are rotated to an open or returned position at this time.

The powered clamp of the present invention has further advantageous features. The powered clamp of the present invention has a single hub capable of accommodating left, right or dual arm attachments. The dual slots formed in the end portions of the hub allow for changing the position of the arm without disassembling the internal mechanism of the powered clamp. The arm may be mounted in one of two positions. Additionally, the present invention encourages simplified arm mounting or changeover using a single threaded fastener thereby eliminating pressed-on arms, jack screws or set screw retention. The total angle of arm displacement may be easily adjusted by removal of the end cap and replacement of the spacer.

While an embodiment of the powered clamp has been disclosed, it will be appreciated that various modifications may be made without departing from the scope of the present invention. For example, the slide rod, link, hub and arm may be partially or totally disposed externally from a body. Also, various other actuating mechanisms may be employed to move the slide rod such as electric motors, internal combustion motors or manual actuation in combination with a rack and pinion mechanism, gears, pulleys, screw drives or the like. Moreover, the moving arm may have many different shapes for engaging or holding a variety of work pieces or instruments. The specific shapes and moving motions of the slide rod, link and hub may be modified or combined while maintaining various of the other novel aspects of the present invention. Various materials and manufacturing processes have been disclosed in exemplary fashion. However, other materials and processes may be employed. It is intended by the following claims to cover these and other departures from the disclosed embodiment which fall within the true spirit of this invention.

What is claimed is:

1. An apparatus for interfacing with a work piece, the apparatus comprising:

a body;

a hub rotatably supported by said body, said hub being substantially cylindrical in shape and including a substantially planar seat; and an actuator movably supported by said body, said actuator including a slide rod drivingly coupled to said hub, said slide rod including an angled surface selectively engaging said seat when said actuator is in a fully extended position so as to restrict movement of said actuator away from said fully extended position, said slide rod having a longitudinal axis extending through a diameter defined by said cylindrical shape of said hub.

2. The apparatus of claim 1 wherein said angled surface is clear of said seat until said actuator is in said fully extended position.

3. The apparatus of claim 2 wherein said actuator includes a link, said link directly interconnecting said slide rod and said hub, said link having a first end rotatably coupled to said slide rod and a second end rotatably coupled to said hub.

4. The apparatus of claim 3 wherein said slide rod defines a longitudinal axis, said angled surface forming an angle of substantially five (5) degrees with respect to said longitudinal axis.

5. The apparatus of claim 1 wherein said angled surface of said slide rod is selectively engageable and disengageable from contact with said seat by application of a force to said actuator.

6. The apparatus of claim 1 wherein said hub is substantially cylindrically shaped and includes first and second ends outwardly extending beyond said body.

7. The apparatus of claim 6 wherein said first end of said hub includes a pair of orthogonally intersecting slots, said apparatus further including an arm positioned within one of said slots, said arm being drivingly coupled to said actuator.

8. An apparatus for interfacing with a work piece, the apparatus comprising:

a body having a bore with a longitudinal axis;

an actuator linearly moveable in relation to said body, said actuator including a piston coupled to a slide rod, said piston being slidably positioned within said bore, said slide rod being slidable along an axis offset from said longitudinal axis of said bore; and a hub rotatably supported by said body and drivingly coupled to said actuator, said hub being rotatable about a transverse axis which substantially orthogonally intersects said longitudinal axis.

9. The apparatus of claim 8 wherein said hub is substantially cylindrically shaped and includes first and second ends outwardly extending beyond said body.

10. The apparatus of claim 9 wherein said first end of said hub includes a pair of orthogonally intersecting slots, said apparatus further including an arm positioned within one of said slots, said arm being drivingly coupled to said actuator.

11. The apparatus of claim 8 wherein said hub includes a pair of spaced apart circumferential grooves for receipt of a pair of seals.

12. An apparatus for interfacing with a work piece, the apparatus comprising:

a body having a bore with a longitudinal axis;

an actuator axially moveable relative to said body, said actuator having a piston slidable within said bore;

an arm rotatably coupled to said body, said actuator being drivingly coupled to said arm; and an end cap coupled to said body to enclose said bore, said end cap sealingly engaging said bore and being rotatable about said longitudinal axis.

13. The apparatus of claim 12 further including a fastener positioned within a groove formed on a substantially cylindrical outer surface of said end cap, said fastener interconnecting said end cap and said body to restrain said end cap from axial movement while allowing rotation about said longitudinal axis.

14. The apparatus of claim 13 wherein said end cap includes a first port in fluid communication with a first side of said piston and a second port in fluid communication with an opposite, second side of said piston, said second port exiting said end cap between a pair of seals positioned on said substantially cylindrical outer surface.

15. The apparatus of claim 14 wherein said body includes an internal passageway in fluid communication with said second port and said second side of said piston.

16. The apparatus of claim 14 wherein one of said substantially cylindrical outer surface of said end cap and said bore includes two annular grooves axially spaced apart from one another, said grooves in receipt of said pair of seals.

17. The apparatus of claim 13 wherein said fastener includes a pin positioned within a bore transversely extending through said body.

18. The apparatus of claim 12 further including a hub rotatably supported by said body, said hub drivingly interconnecting said actuator and said arm.

19. An apparatus for interfacing with a work piece, the apparatus comprising:

a body having a bore defining a longitudinal axis;

an actuator axially moveable relative to said body, said actuator being slidably positioned within said bore;

a position sensor coupled to said body, said position sensor being operable to indicate the presence or absence of said actuator at a predetermined location, said position sensor including a first substantially cylindrical sensor head slidably positioned within a first aperture of said body and a second substantially cylindrical sensor head slidably positioned within a second aperture of said body, said first aperture and second aperture being spaced apart from one another, each aperture extending transversely and in communication with said bore.

20. The apparatus of claim 19 further including a seal positioned between an outer cylindrical surface of said first sensor head and a wall of said first aperture.

21. The apparatus of claim 20 further including a plate enclosing a pocket formed with said body, said position sensor including a wire and a control switch, said wire electrically coupling said sensor head and said control switch, said pocket being in communication with said first and second apertures, wherein at least a portion of said wire is positioned in said pocket.

22. The apparatus of claim 20 wherein said control switch includes a plug, said control switch being selectively mountable to said body in a plurality of orientations to locate said plug at a plurality of positions.

23. The apparatus of claim 22 wherein said plug is pivotably coupled to said control switch, said plug being selectively positionable at a plurality of angular orientations.

24. An apparatus for interfacing with a work piece, the apparatus comprising:

a body having a bore;

an actuator positioned within said bore, said actuator being axially moveable relative to said body;

an arm;

a hub rotatably supported by said body, said hub drivingly coupled to said actuator, said hub having first and second end portions extending outwardly beyond said body, said first end portion including a pair of orthogonally intersecting grooves, said arm being positioned within one of said grooves and being drivingly coupled to said hub.

25. The apparatus of claim 24 further including a threaded fastener removably coupling said arm to said hub.

26. The apparatus of claim 25 wherein said arm is selectively positionable in either of said grooves.

27. The apparatus of claim 26 wherein said arm is rotatable from an opened position to a clamped position, said clamped position being varied by positioning said arm within the other of said grooves.

28. The apparatus of claim 27 wherein a total rotational angle traveled by said arm is variable.

29. The apparatus of claim 24 wherein said arm is shaped as a yoke having a pair of bifurcated legs, each of said legs being coupled to said hub.

30. The apparatus of claim 29 wherein said second end of said hub includes a pair of grooves positioned substantially parallel to said grooves of said first end, each leg being positioned within one of said grooves at opposite ends of said hub.

31. The apparatus of claim 30 wherein each leg is coupled to said hub by a single fastener.

32. An apparatus for interfacing with a work piece, the apparatus comprising:

a body;

a hub rotatably supported by said body, said hub including a substantially planar seat; and an actuator movably supported by said body, said actuator including a slide rod drivingly coupled to said hub, said slide rod including an angled surface selectively engaging said seat when said actuator is in a fully extended position so as to restrict movement of said actuator away from said fully extended position, said hub being substantially cylindrically shaped and including first and second ends outwardly extending beyond said body, said first end of said hub including a pair of orthogonally intersecting slots, said apparatus further including an arm positioned within one of said slots, said arm being drivingly coupled to said actuator.

* * * * *